(12) United States Patent
Donald et al.

(10) Patent No.: US 6,981,428 B2
(45) Date of Patent: Jan. 3, 2006

(54) LINEAR ACTUATORS

(75) Inventors: Alistair Ross Donald, North Somerset (GB); Paul John Dursley, Bristol (GB)

(73) Assignee: Vetco Gray Controls Limited, Bristol (GB)

( * ) Notice: Subject to any disclaimer, the term of this patent is extended or adjusted under 35 U.S.C. 154(b) by 188 days.

(21) Appl. No.: 10/352,442

(22) Filed: Jan. 28, 2003

(65) Prior Publication Data

US 2003/0145667 A1 Aug. 7, 2003

(30) Foreign Application Priority Data

Feb. 1, 2002 (GB) .................................. 0202405
Apr. 19, 2002 (GB) .................................. 0209047

(51) Int. Cl.
*F16H 25/20* (2006.01)

(52) U.S. Cl. .................................. 74/89.26; 74/89.38

(58) Field of Classification Search ............... 74/89.23, 74/89.26, 89.38, 89.39, 89.31; 251/68, 69, 251/71

See application file for complete search history.

(56) References Cited

U.S. PATENT DOCUMENTS

| | | | | |
|---|---|---|---|---|
| 2,930,571 | A | * | 3/1960 | Vogl ............................ 251/69 |
| 3,485,110 | A | * | 12/1969 | Beck .......................... 74/89.42 |
| 4,256,065 | A | * | 3/1981 | Hirt .......................... 123/90.11 |
| 4,584,902 | A | | 4/1986 | Fry |
| 4,745,815 | A | * | 5/1988 | Klopfenstein .............. 74/89.25 |
| 4,920,811 | A | | 5/1990 | Hopper |
| 5,070,944 | A | | 12/1991 | Hopper |
| 5,195,721 | A | * | 3/1993 | Akkerman ............. 251/129.13 |
| 5,214,972 | A | * | 6/1993 | Larson et al. .............. 74/89.26 |
| 5,497,672 | A | | 3/1996 | Appleford et al. |
| 5,832,944 | A | | 11/1998 | Lindner |
| 5,865,272 | A | | 2/1999 | Wiggins et al. |
| 5,983,743 | A | | 11/1999 | McGregor et al. |
| 5,984,260 | A | | 11/1999 | Rawson et al. |
| 6,041,857 | A | | 3/2000 | Carmody et al. |
| 6,152,167 | A | | 11/2000 | Baker |
| 6,176,318 | B1 | | 1/2001 | Drakeley et al. |
| 6,253,843 | B1 | | 7/2001 | Rawson et al. |
| 6,257,549 | B1 | | 7/2001 | Hopper |
| 6,446,519 | B1 | | 9/2002 | Biester |
| 6,585,228 | B1 | | 7/2003 | McCaskill |
| 6,722,477 | B1 | * | 4/2004 | Wolfsteiner et al. ....... 188/72.9 |

FOREIGN PATENT DOCUMENTS

DE 1162655 2/1964

(Continued)

*Primary Examiner*—William C Joyce
(74) *Attorney, Agent, or Firm*—Bracewell & Giuliani LLP

(57) ABSTRACT

A linear actuator comprises rotary motion producing means (1,2,3,4,5); linear motion producing means (6,7,10,11,12) coupled with the rotary motion producing means for converting rotary motion to linear motion; a driven member (18) movable linearly by the linear motion providing means from a first position to a second position; and backdrive means (22) for returning the driven member to the first position. The arrangement is such that the linear motion producing means includes torque reaction means (13,15,16,17) which, in normal operation, is in an activated condition and provides a torque reaction path to enable the driven member to be moved from the first to the second position but which, in the event of a fault, is in a de-activated condition so that it no longer provides the torque reaction path and the backdrive means can move the driven member to the first position, without disengaging the rotary motion producing means from the linear motion producing means.

12 Claims, 4 Drawing Sheets

FOREIGN PATENT DOCUMENTS

| | | |
|---|---|---|
| EP | 1024422 | 8/2000 |
| GB | 2116790 | 9/1983 |
| GB | 2119172 | 11/1983 |
| GB | 2120349 | 11/1983 |
| GB | 2122034 | 1/1984 |
| GB | 2196414 | 4/1988 |
| GB | 2216625 | 10/1989 |
| GB | 2240376 | 7/1991 |
| GB | 2255866 | 11/1992 |
| GB | 2266943 | 11/1993 |
| GB | 2283061 | 4/1995 |
| GB | 2291949 A | 2/1996 |
| GB | 2346429 | 8/2000 |
| WO | WO01/14775 | 3/2001 |
| WO | WO01/86370 | 11/2001 |
| WO | WO01/86371 | 11/2001 |

\* cited by examiner

LINEAR ACTUATORS

FIELD OF THE INVENTION

The present invention relates to linear actuators.

BACKGROUND OF THE INVENTION

Linear electric actuators, i.e. electric actuators with push-pull outputs, are becoming employed in fluid extraction installations as a replacement for the traditional hydraulic linear actuators, typically employed to operate valves. One of the features of such an actuator, particularly for a subsea installation, is that the device operated by the actuator should return to a required position in the event of a failure, such as a loss of electrical control or a mechanical failure. For example, if the actuator operates a valve, then the valve must revert to a closed position, or, more rarely, to an open position, in the event of a failure. There are many actuators available on the market most of which employ an electric motor which drives, via a gearbox, a rotary to linear mechanism such as a screw drive and a small percentage of them have a fail-safe mechanism built in. Those that are available as fail-safe often employ an integral mechanism that 'rewinds' the actuator back to its original position in the event of a failure of electric power. The actuator motor winds or compresses a spring when it is powered, so that on power failure the spring returns the actuator to its original position. Typically, the motor drives the linear mechanism to an electrically powered mechanical latch to fully operate a valve, and on failure of the power supply to the latch, the spring returns the linear mechanism to its original position.

A hydraulic actuator normally comprises a simple piston and cylinder and has a fail-safe mechanism provided by the compression of a coil spring so that failure of the hydraulic power source results in the actuator reverting to its initial position by virtue of the potential energy in the spring returning the piston to its original position. Such a mechanism is very simple and reliable and is thus attractive to the fluid extraction contractor, which is one reason why hydraulic actuators have been popular.

The disadvantage of an electric actuator as described above is that the fail-safe mechanism is not simple and has to reverse drive the actuator through its relatively complicated mechanism, which includes the motor, gearbox and rotary to linear mechanism. Furthermore, any failure of the relatively complicated drive mechanism involving seizing or jamming will also result in failure of the fail-safe feature. It is an additional problem that the provision of a fail-safe mechanism may prevent the actuator from being driven in both directions, ie extending and retracting. This is an important feature with several benefits, e.g. there are two methods of retracting the actuator as opposed to the fail-safe only, driving in reverse may allow "freeing-up" of sticky valves and driving in reverse could also give extra capability for wire-cutting operations.

As prior art in the field of linear actuators, there may be mentioned: EP-A-1,024,422; U.S. Pat. Nos. 5,195,721; 5,497,672; WO 01/14775; GB-A-2,266,943; U.S. Pat. Nos. 5,983,743; 5,984,260; 6,041,857; 6,253,843; GB-A-2,216,625; GB-A-2,240,376; U.S. Pat. Nos. 4,920,811; 5,070,944; 6,257,549; GB-A-2,346,429; U.S. Pat. No. 6,152,167; WO 01/86370; WO 01/86371; U.S. Pat. No. 6,176,318; GB-A-2,116,790; GB-A-2,119,172; GB-A-2,120,349; GB-A-2,122,034; GB-A-2,196,414; GB-A-2,255,866; GB-A-2,283,061; GB-A-2,291,949; U.S. Pat. Nos. 5,865,272; and 4,584,902.

SUMMARY OF THE INVENTION

According to the present invention, there is provided a linear actuator comprising:
rotary motion producing means;
linear motion producing means coupled with said rotary motion producing means for converting said rotary motion to linear motion, said linear motion producing means comprising a threaded shaft and nut arrangement;
a driven member movable linearly by said linear motion producing means between a first position and a second position, said driven member being coupled to one of said shaft and nut arrangement; and
back-drive means for returning said driven member to said first position in the event of a fault;
characterised in that:
said linear motion producing means includes torque reaction means which, in normal operation, is in an activated condition and provides a torque reaction path to enable the driven member to be reversibly moved between said first and said second positions, the driven member being restrained from rotating, but which, in the event of a fault, is in a de-activated condition so that it no longer provides said torque reaction path and said back-drive means can move the driven member to said first position, without disengaging the rotary motion producing means.

The nut arrangement may be rotated by said rotary motion producing means to move said shaft linearly, said shaft being coupled to said driven member.

Said torque reaction means is preferably such that it prevents rotation of said shaft during normal operation while said driven member is being moved from said first position to said second position but allows rotation of said shaft in the event of a fault so that said back-drive means can move the driven member to said first position.

Said torque reaction means may includes a first gear wheel, on said shaft, coupled to a further gear wheel and means which prevents rotation of the further gear wheel during normal operation so that said gear wheels and said shaft cannot rotate but which allows said further gear wheel and thereby said first gear wheel and said shaft to rotate in the event of a fault.

Said shaft and said driven member may be coupled so that said driven member can only move linearly when said shaft rotates.

Alternatively, said shaft may be rotated by said rotary motion producing means, said shaft being coupled to said driven member. The shaft could be coupled to said rotary motion producing means via clutch means, said clutch means providing said torque reaction path.

Said rotary motion producing means could comprise a worm and wheel arrangement.

Said driven member could be moved from said first to said second position against the action of said back-drive means.

Said back-drive means could comprise spring means.

DESCRIPTION OF PREFERRED EMBODIMENTS

Figure 1:
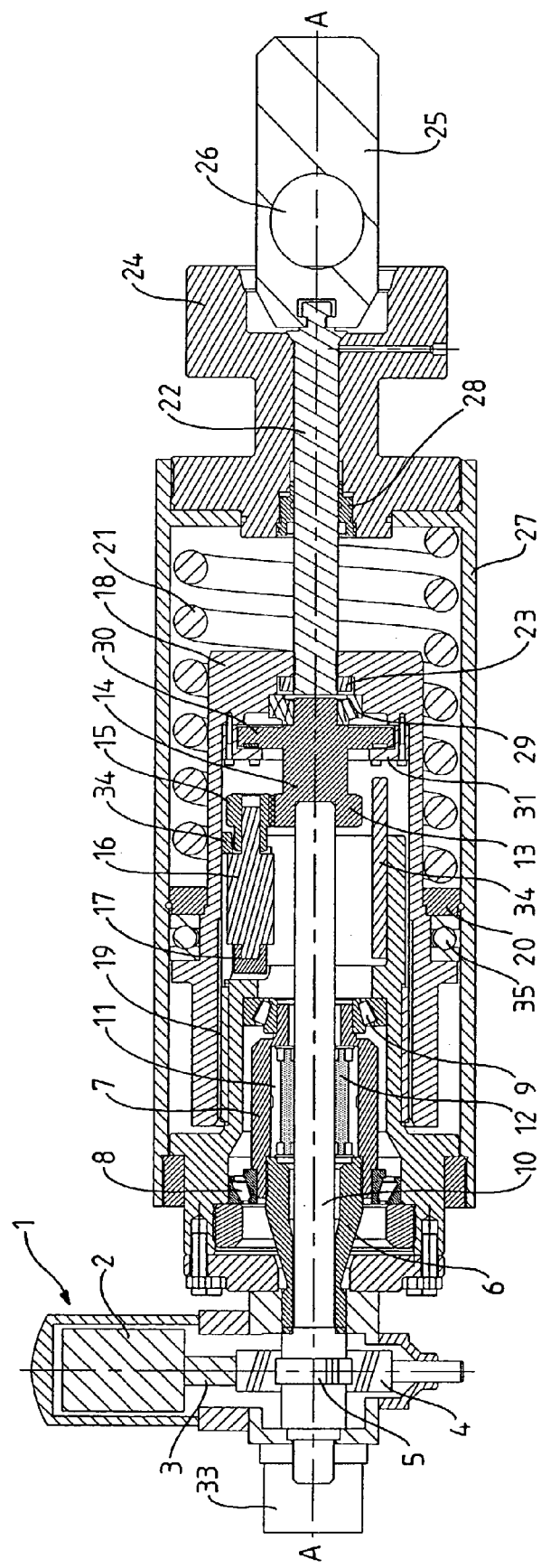
FIG. 1 is a longitudinal section through an example of a linear actuator according to the invention.
Figure 2:
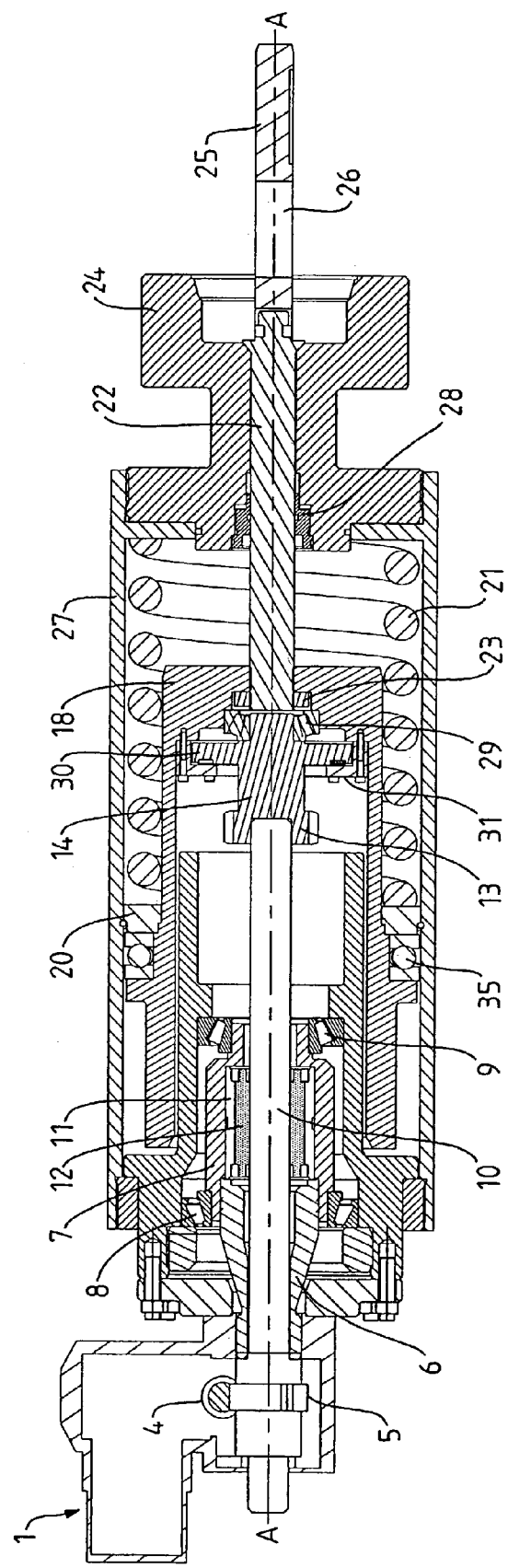
FIG. 2 is a longitudinal section through the linear actuator but at 90° relative to FIG. 1.
Figure 3:
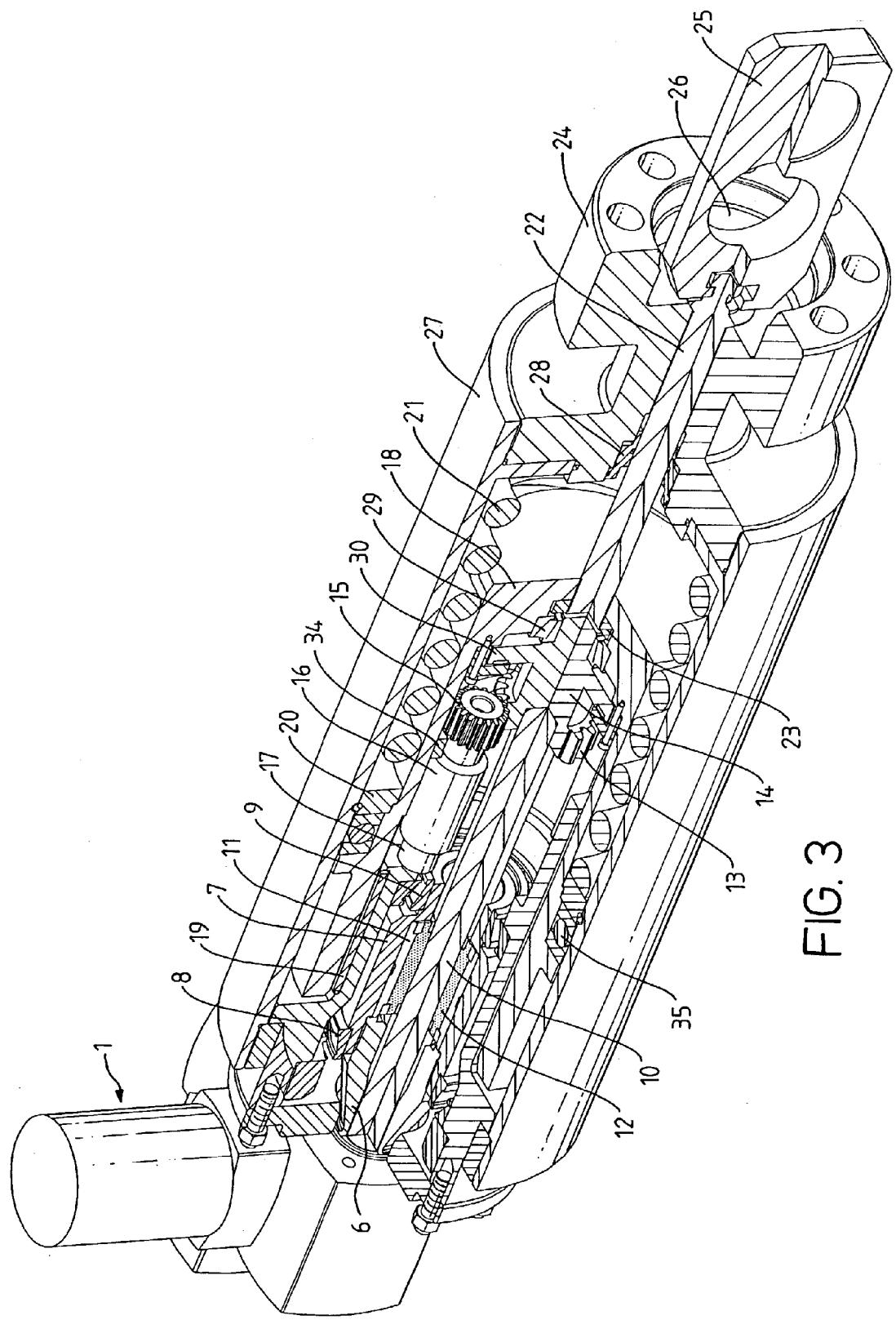
FIG. 3 is a cut-away, perspective view of the actuator.

Referring to FIGS. 1–3, an electric motor unit 1 includes an electric motor 2 which drives via a shaft 3 a worm and wheel transmission in the unit comprising a worm 4 and a wheel 5. The wheel 5 is fastened to a rotatable member 6 to give a rotary output about an axis A to the member 6. The member 6 is attached to tubular roller screw mounting structure 7 such that structure 7 also rotates with member 6, structure 7 being supported by tapered-roller bearings 8 and 9. Reference numeral 10 designates an externally threaded shaft, there being an internally threaded tubular nut 11 coupled to shaft 10 as described below, tubular nut 10 being located between member 6 and the right-hand end in the figures of structure 7 and attached to the latter. Thus, tubular nut 11 rotates with member 6.

The thread on shaft 10 is coupled with the thread of the tubular nut 11. The arrangement is not a simple nut on threaded shaft, but a low friction planetary roller screw arrangement, there being, between the inside of the nut 11 and around the shaft 10, a plurality of longitudinal, externally threaded planetary rollers 12 whose axes are parallel to the axis A, these rollers having threads which engage with and match those of nut 11 and shaft 10. Thus, when the nut 11 rotates, the shaft 10 moves axially because it is prevented from rotating by a prevention of rotation locking mechanism to be described below.

The prevention of rotation locking mechanism provides a torque reaction path and comprises a gear wheel 13 (formed integrally as part of a member 14) with a mating pinion gear wheel 15, a gearbox 16 and an electrically operated brake 17. The gear wheel 15 is attached to the shaft 10 (which at this point has changed from having a thread to being a circular shaft) as a result of the shaft 10 engaging with member 14 as a result of a threaded or pinned connection or an interference fit, for example. The gear wheel 13 is permanently meshed with the pinion gear wheel 15 which in turn is attached to the output of the gearbox 16. The electrically operated brake 17 locks the output of the gearbox 16 while the brake 17 is electrically energised. Thus, the energised brake 17 locks the shaft 10 from rotating.

When the motor 2 of electric motor drive unit 1 rotates and thereby causes the shaft 10 to move axially, a housing 18 of the gear wheels 13 and 15, gearbox 16 and brake 17 assembly is also moved axially in the same direction, the housing 18 sliding along a key or spline connection at 19, reference numeral 34 designating a bracket fastening gearbox 16 to housing 18 to close the torque reaction path. At the same time, an annular member 20 attached to the housing 18 presses against an actuator return spring 21 and compresses it. The actuator is held in position by the worm 4 and wheel 5 arrangement in the electric motor drive unit 1, i.e. the worm and wheel arrangement cannot be backdriven and acts as a brake. In this connection the worm 4 and wheel 5 arrangement is an inefficient (high friction) arrangement for converting rotary motion from motor 2 to rotary motion about axis A, the rotary motion to linear motion converting arrangement of nut 11, shaft 10 and rollers 12 being a relatively efficient (low friction) motion converting arrangement.

In use, the axial movement of the shaft 10 is transmitted to a valve stem 22 of a valve controlled by the actuator, the valve stem being locked to housing 18 via a lock nut 23. Reference numeral 24 designates a valve bonnet of the valve and reference numeral 25 designates a gate of the valve, which (when the valve is open as a result of axial movement rightwards in the figures of stem 22) allows fluid flow through an opening 26. The valve bonnet 24 is attached to an annular housing 27 of the actuator, reference numeral 28 designating a sealing arrangement through which valve stem passes. The valve could, for example, be for controlling the operation of an underwater hydrocarbon production system.

The coupling between the shaft 10 and valve stem 22 is such that shaft 10 and member 14 are able to rotate but stem 22 is not. Such a coupling is, by way of example, via a spherical roller thrust bearing 29 and a flange 30 which is part of member 14, which flange can rotate against a ring 31 bolted to housing 18, there being a thrust bearing between ring 31 and flange 30.

As long as power is applied to the electric brake 17, the actuator may be controllably driven in both directions, ie extending and retracting.

If power is removed from the electric brake 17, fail-safe operation occurs as a result of de-activation of the prevention of rotation locking mechanism, allowing the pinion gear wheel 15 to rotate. This in turn permits the gear wheel 13 and the shaft 10 to rotate. The return spring 21 provides sufficient force to overcome friction in the planetary roller screw arrangement comprising nut 11, rollers 12 and shaft 10 and the prevention of rotation locking mechanism comprising gear wheels 13 and 15, gearbox 16 and brake 17 such that the whole mechanism back-drives via rotation of the shaft 10 inside the nut 11. Thus, during this fail-safe axial return action, the shaft 10 is both rotating and moving axially. This is permitted as a result of the relative efficiency of the planetary roller screw arrangement comprising nut 11, rollers 12 and shaft 10 and the relative inefficiency of the worm 4 wheel 5 arrangement, the latter arrangement acting as a brake and permitting such back-driving without the need to disengage the rotary motion producing means (2, 3, 4, 5) from the linear motion producing means (6, 7, 10, 11, 12) or otherwise prevent motor 2 being back-driven. Reference numeral 35 designates a ball roller thrust bearing to take up torque from spring 22.

Instead of brake 17, gearbox 16 and gear wheels 13 and 15 alternative means could be used-for example a single component such as a toothed brake.

In order to re-activate the drive, the electrical supply to the brake 17 is restored, but the electric drive motor 2 needs to know that it must drive again in the same direction as it operated the actuator in the first place. To achieve this a position sensor 32 (see FIG. 1) is fitted to determine the axial position of the shaft 10 and thus feed position information to an electronic control of the electric motor of unit 1, the position sensor 32 being for example an inductive sensor.

If desired, means may be provided at 33 (see FIG. 1) for shaft 10 to be rotated manually or by an underwater remotely operated vehicle (ROV) for example, as an override operation.

In the case of the actuation of devices such as large valves, typically fitted to 2 inch and 5 inch bore pipes, the linear actuator described above is particularly practical. However, in the case of smaller bore systems, typically ½ and ¾ inch, such as those involved in the chemical injection processes employed in fluid extraction from wells, the large size of the actuator might not be suitable. The following example overcomes this problem by providing a compact fail-safe linear actuator using an electric clutch which can be powered by low power available, whilst transmitting the lower torque required to operate the actuator to open and close a valve in such a smaller bore system. However, it does need to back-drive part of the actuator drive mechanism to achieve fail-safe operation.

Figure 4:
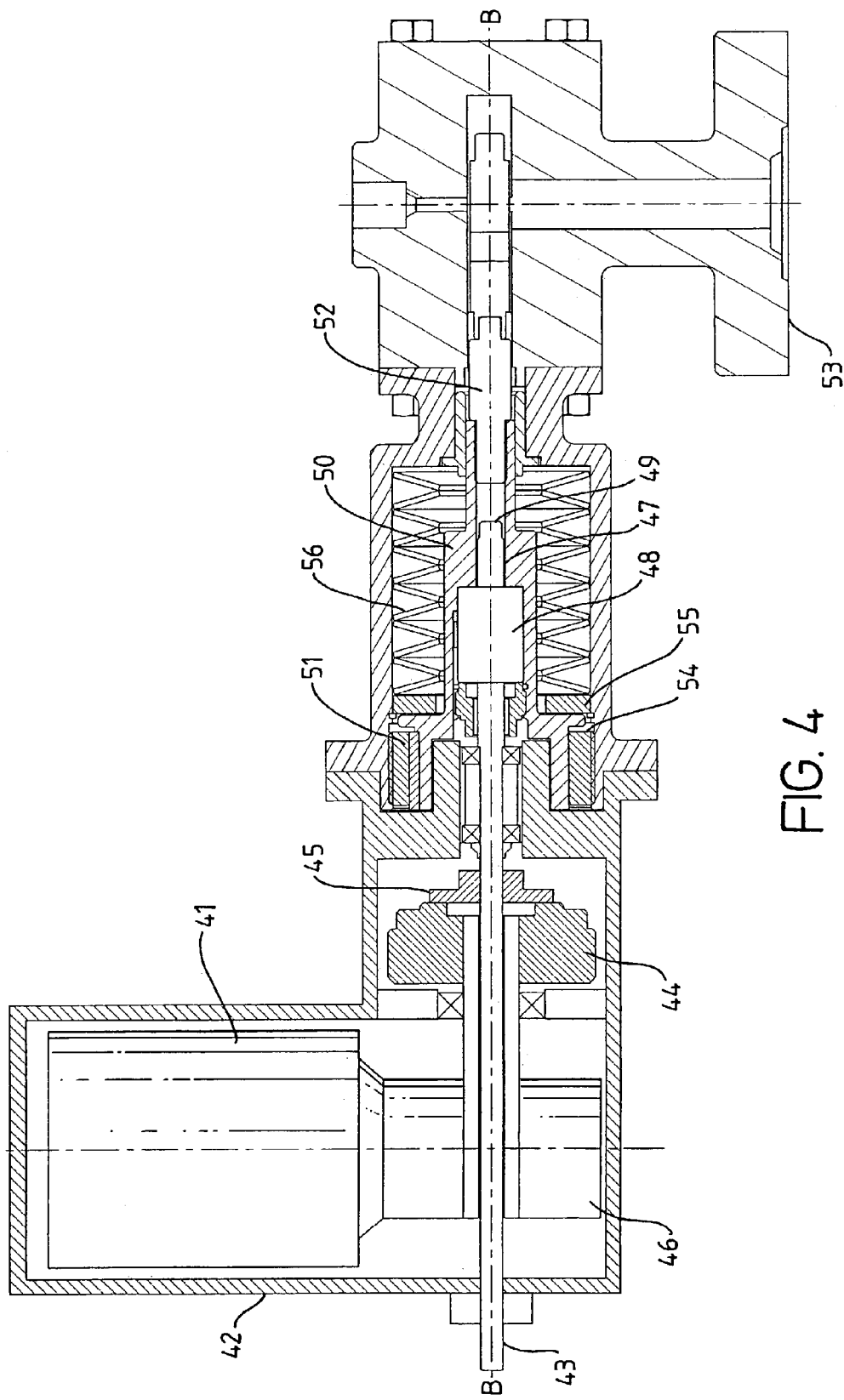
FIG. 4 is a longitudinal section through another example of a linear actuator according to the invention.

Referring to FIG. 4, an electric motor 41 (typically 3, phase 300 Watt) in a housing 42 drives a shaft 43 via an electric clutch assembly 44/45 and a worm and wheel gearbox 46. The two sections 44 and 45 of the clutch assembly are locked together when electric power is fed to it. The clutch section 44 is attached to the drive output of the worm and wheel gearbox 46 and the other section 45 of the clutch assembly is attached to the shaft 43. Thus, when the clutch assembly 44/45 (providing a torque reaction path) is electrically energised, the shaft 43 is rotated by the electric motor 41, and when the clutch assembly 44/45 is electrically de-energised, the shaft 43 is detached from the drive and is free to rotate independently from it.

The shaft 43 extends from the housing 42, to provide the facility of enabling an ROV to rotate the shaft 43 in the event of emergency or during commissioning. The other end of the shaft 43 is threaded as shown at 47 as part of a planetary roller screw drive mechanism having a nut 48. The shaft 43 terminates at the position 49. The nut 48 of the planetary roller screw drive mechanism keyed to a carrier 50 in such a way that the nut cannot rotate. The carrier 50 is also keyed to a ring 51 which, to facilitate assembly, is screwed into the housing 42 and then locked such that the carrier 50 and nut 48 can only move axially when the shaft 43 is rotated. Thus, the planetary roller screw drive mechanism translates the rotation of the shaft 43 about axis B—B to an axial linear motion of the carrier 50.

By selecting the appropriate direction of rotation of the electric motor 41, the carrier 50 will move to the left or right in FIG. 4. The carrier 50 is attached to an axial actuating shaft 52 of a valve 53. A circlip 54 in the carrier 50 retains a plate 55 which mates with an assembly 56 of Belleville disc springs. Thus, when the carrier 50 moves to the right, the shaft 52 also moves to the right to operate the valve 53, typically to open it, whilst at the same time the plate 55 compresses the spring assembly 56.

Compression of the spring assembly 56 stores the energy required for fail-safe operation. When the actuator has fully operated the valve 53, the electric motor 41 is de-energised, but the electric clutch assembly 44/45 is kept energised. The relatively inefficient (high friction) worm and wheel gearbox 46 does not permit back-driving of the shaft 43 and thus the valve 53 remains operated. In the event of failure, or deliberate removal in an emergency of the electric supply to the clutch assembly, the clutch sections 44 and 45 separate, i.e. they are no longer locked together, and thus shaft 43 is free to rotate. Under these conditions, the stored energy in the spring assembly 56 will push the carrier 50 towards the left through the high efficiency (low friction) drive of the planetary roller screw drive mechanism 47/48 and the now free to rotate shaft 43, thus returning the valve 53 to its original, typically closed position. Thus this process provides a fail-safe operation of the actuator, without the need to disengage the rotary motion producing means (41, 46) from the linear motion producing means (43, 48, 50, 52).

In the linear actuator of FIG. 4 the actuator housing and the valve housing are separate and mated, for example by bolting, together but they could instead be integral with each other.

The fail-safe linear actuator of FIG. 4 can be used for the linear actuation of any suitable device, e.g. for the operation of sub-sea devices, such as valves, for small pipe bore chemical injection for sub-sea, production fluid, extraction wells. The actuator is kept compact by the use of a clutch, a high efficiency planetary roller screw drive mechanism providing conversion of rotary to linear motion and the use of a Belleville disc spring assembly to store energy.

What is claimed is:

1. A linear actuator comprising:
   rotary motion producing means;
   linear motion producing means coupled with said rotary motion producing means for converting said rotary motion to linear motion, said linear motion producing means comprising a threaded shaft and nut arrangement;
   a driven member movable linearly by said linear motion producing means between a first position and a second position, said driven member being coupled to one of said shaft and nut arrangement; and
   back-drive means for returning said driven member to said first position in the event of a fault;
   characterized in that:
   said linear motion producing means includes torque reaction means which, in normal operation, is in an activated condition and provides a torque reaction path to enable the driven member to be reversibly moved between said first and said second positions, the driven member being restrained from rotating, but which, in the event of a fault, is in a de-activated condition so that it no longer provides said torque reaction path and said back-drive means can move the driven member to said first position, without disengaging the rotary motion producing means; wherein the nut arrangement is rotated by a worm and wheel arrangement to move said shaft linearly and said shaft is coupled to said driven member; and
   wherein said torque reaction means includes a first gear wheel on said shaft, coupled to a further gear wheel and means which prevents rotation of the further gear wheel during normal operation so that said gear wheels and said shaft cannot rotate but which allows said further gear wheel and thereby said first gear wheel and said shaft to rotate in the event of a fault.

2. A linear actuator according to claim 1, wherein said driven member is moved from said first to said second position against the action of said back-drive member.

3. A linear actuator according to claim 1, wherein said back-drive member comprises a spring.

4. A linear actuator according to claim 1 wherein when said torque reaction assembly is in a de-activated condition, said back-drive member can move the driven member to said first position, without disengaging the rotary motion producing device.

5. A linear actuator comprising:
   an electrical motor;
   a first gear train connected to said electrical motor and having an output member that is rotated by said electrical motor;
   a motion converter coupled with said output member of said first gear train for converting rotary motion of said output member of said first gear train to linear motion, said linear motion converter comprising a linearly stationary rotatable first member in threaded engagement with a linearly movable second member, said first member being coupled to said output member of said first gear train for being rotatably driven, said second member being rotatable but moving linearly when said first member is rotated and said second member is prevented from rotation;
   a spring that is biased against said second member for opposing forward linear motion of said second member;
   a second gear train having an input member coupled to said second member and an output member that rotates in the event of rotation of said second member;

an electrically actuated anti-rotation member that engages said output member of said second gear train for selectively preventing rotation of said output member of said second gear train and thus said second member when in a braking position, and when in a released position said anti-rotation member allowing said second member to rotate so that said spring will push said second member linearly in a rearward direction; and wherein said second gear train and said anti-rotation member move linearly in unison with said second member.

6. A linear actuator according to claim 5, wherein said second gear train comprises:
a hub gear mounted to said second member for any rotation therewith, thereby defining said input member of said second gear train;
a gear box coupled to said hub gear, said output member being an output shaft of said gear box; and wherein
said anti-rotation member engages said output shaft of said gear box.

7. A linear actuator according to claim 5, wherein said second member moves linearly in a forward direction while said motor rotates said output member of said first gear train in a first direction, and said second member moves linearly in the rearward direction while said motor rotates said output member of said first gear train in a second direction.

8. A linear actuator according to claim 5, wherein said second gear train is on an opposite end of said second member from said first gear train.

9. A linear actuator comprising:
an electrical motor;
a first gear train connected to said electrical motor and having an output member that is rotated by said electrical motor;
a motion converter coupled with said output member of said first gear train for converting rotary motion of said output member of said first gear train to linear motion, said linear motion converter comprising a linearly stationary rotatable first member in threaded engagement with a linearly movable second member, said first member being coupled to said output member of said first gear train for being rotatably driven, said second member being rotatable but moving linearly when said first member is rotated and said second member is prevented from rotation;
a spring that is biased against said second member for opposing forward linear motion of said second member;
a second gear train having an input member coupled to said second member and an output member that rotates in the event of rotation of said second member;
an electrically actuated anti-rotation member that engages said output member of said second gear train for selectively preventing rotation of said output member of said second gear train and thus said second member when in a braking position, and when in a released position said anti-rotation member allowing said second member to rotate so that said spring will push said second member linearly in a rearward direction;
an outer housing;
an inner housing mounted in said outer housing for linear movement along said axis in a forward direction and in the rearward direction relative to said outer housing, said inner housing enclosing said second member of said motion converter and moving linearly in unison with said second member; and wherein said spring has a forward end in engagement with a wall in said outer housing and a rearward end in engagement with a shoulder on said inner housing to bias said inner housing toward the rearward direction.

10. A linear actuator according to claim 9, wherein:
said first member of said motion converter comprises a linearly stationary but rotatable nut member;
said second member of said motion converter comprises a threaded shaft; and wherein said actuator further comprises:
a hub mounted on a forward end of said shaft for movement with said shaft, said hub being in rotatable engagement with said inner housing; said second gear train comprising:
a hub gear mounted to said hub for rotation therewith; and
a gearbox mounted to said inner housing for linear movement therewith, said gearbox being coupled to said hub gear.

11. A linear actuator according to claim 10 further comprising:
a stem mounted to a forward end of said inner housing for linear movement therewith, said stem extending slidingly through an aperture in a forward end of said outer housing.

12. A linear actuator comprising:
an electrical motor;
a first gear train connected to said electrical motor and having an output member that is rotated by said electrical motor;
a motion converter coupled with said output member of said first gear train for converting rotary motion of said output member of said first gear train to linear motion, said linear motion converter comprising a linearly stationary rotatable first member in threaded engagement with a linearly movable second member, said first member being coupled to said output member of said first gear train for being rotatably driven, said second member being rotatable but moving linearly when said first member is rotated and said second member is prevented from rotation;
a spring that is biased against said second member for opposing forward linear motion of said second member;
a second gear train having an input member coupled to said second member and an output member that rotates in the event of rotation of said second member;
an electrically actuated anti-rotation member that engages said output member of said second gear train for selectively preventing rotation of said output member of said second gear train and thus said second member when in a braking position, and when in a released position said anti-rotation member allowing said second member to rotate so that said spring will push said second member linearly in a rearward direction; and wherein said first gear train comprises a worm gear arrangement.

* * * * *